United States Patent
Jacura et al.

[15] 3,666,802
[45] May 30, 1972

[54] RECOVERY OF 3-(3,4-DIHYDROXYPHENYL)-L-ALANINE FROM BEANS WITH WATER

[72] Inventors: Zenon Jacura, North Plainfield; Phillip Adams, Murray Hill; Benedict R. Juliano, Mountainside, all of N.J.

[73] Assignee: Millmaster Onyx Corporation, New York, N.Y.

[22] Filed: May 4, 1970

[21] Appl. No.: 34,573

[52] U.S. Cl. ............................................................260/519
[51] Int. Cl. ..........................................................C07c 101/72
[58] Field of Search...............................................260/519

[56] References Cited

UNITED STATES PATENTS 3,253,023   5/1966   Wysong..................................260/519
2,661,371   12/1953   Dowling..................................260/519

*Primary Examiner*—Lorraine A. Weinberger
*Assistant Examiner*—R. S. Weissberg
*Attorney*—Richard L. Cannaday

[57] ABSTRACT

L–DOPA is recovered from, preferably comminuted, beans containing it by contacting the beans with a reagent consisting essentially of liquid water. Efficacious novel products comprising L–DOPA are produced.

3 Claims, No Drawings

RECOVERY OF 3-(3,4-DIHYDROXYPHENYL)-L-ALANINE FROM BEANS WITH WATER

BACKGROUND OF THE INVENTION

1. Field of the Invention 3-(3,4-dihydroxyphenyl)-L-alanine, hereinafter referred to as L-DOPA, is finding increasing utility for pharmaceutical purposes, particularly for treatment of Parkinson's Disease. Economic processes for obtaining the desired material are extremely desirable. Additionally, it is desirable to produce products containing L-DOPA in a technical grade form which, while not pharmaceutically pure, are still effective for medicinal purposes.

2. Description of the Prior Art

Several methods for recovering L-DOPA from comminuted velvet beans have been developed, e.g., extraction with dilute sulfurous acid or various water-soluble, organic acids. The acidic reagents bring down excessive impurities and the extraction can be insufficiently selective.

SUMMARY OF THE INVENTION

It has now been found that L-DOPA can be recovered with high selectivity and good yields from beans containing it by contacting the beans with a reagent consisting essentially of water to dissolve a substantial proportion of the L-DOPA contained therein; separating the extract phase from the beans; and recovering a novel L-DOPA product.

It is indeed surprising that the results indicated can be obtained because it would have been expected that poor ultimate yields would result because of instability of the systems encountered. It is further very surprising that the technical grade L-DOPA product is effective in the form obtained for pharmaceutical purposes.

DISCUSSION OF PREFERRED EMBODIMENTS

This invention is applicable to the recovery of L-DOPA from beans containing it, generally of the Stizolobium or Vicia faba genus.

Examples of the beans are Vicia faba and Stizolobium deeringianum.

Preferably the beans are comminuted before the contacting step. The comminuting is done by conventional means in the dry or wet state to conveniently 20–50 mesh.

In the practice of this invention, a reagent consisting essentially of liquid water is employed. The water is conveniently employed in amounts of about 4–10 parts by weight based on beans.

A contacting temperature in the range of about 0 to 100° C., preferably 10° to 40° C., is used.

The contacting time is sufficient to dissolve at least a substantial proportion of the L-DOPA. Usually an extraction time of up to about four hours suffices, depending on particle size.

The resulting extract phase, together with water-soluble impurities from the beans, is separated from the comminuted material, preferably by decantation, filtration, centrifuging, etc.

The L-DOPA product admixed with water-soluble impurities, is recovered by distilling off the water at reduced or atmospheric pressure.

Increased product yields are obtainable by including the additional step of maintaining the separated extract phase at a temperature in the range of about 20° to 80° C. for a time period in the range of about 1 to 72 hours prior to the recovery step. In general, the higher the temperature, the lower the time. Desirably the resultant system has insolubles removed before distillation.

The novel recovered L-DOPA product typically contains about 15 to 40 wt.% L-DOPA admixed with the water-soluble impurities from the extracted beans. It is yellow tan, has an acidic taste, and is partly soluble in water.

The process of this invention results in the recovery of a substantial portion of the L-DOPA from the beans, i.e., better than 90 wt.%.

The L-DOPA product can be crystallized to 100 percent assay by treatment with activated carbon and recrystallization.

This invention, product work-up, and their advantages will be better understood by reference to the following examples.

EXAMPLE 200 g. of ground velvet bean meal, containing 8 g. L-DOPA (4.0 percent) was stirred at room temperature under nitrogen with 1,800 ml water for 62 hours (consolidating the extraction and maintenance steps). The slurry was filtered through a Buechner funnel with the aid of acid-washed Supercel and the cake was washed with 650 ml water to give 2,372 g. filtrate, assaying 0.33 percent L-DOPA or 7.8 g. The liquid was concentrated to dryness in vacuum to give 34 g. solid (17 percent of charged bean meal), consisting of 22 percent L-DOPA or 7.5 g. L-DOPA, a 94 percent yield.

This demonstrates the extremely good selectivities and yields obtained by the process of this invention.

Other beans were substituted for the beans employed in the example and comparable results obtained.

Concentrates and dried products from the recovery steps on treatment with activated carbon and recrystallization gave L-DOPA of 100 percent assay.

The advantages of this invention will be apparent to the skilled in the art. Among these are the providing of an inexpensive process for recovering L-DOPA with good selectivity and yields, and the obtaining of novel, efficacious compositions of matter.

It is to be understood that this invention is not limited to the specific examples which have been offered merely as illustrations, and that modifications can be made without departing from the spirit thereof.

What is claimed is:

1. A method for recovering 3-(3,4-dihydroxyphenyl)-L-alanine from comminuted beans containing it, which comprises the steps of contacting said beans with a reagent consisting essentially of liquid water at a temperature in the range of about 0° to 100° C. for a time sufficient to dissolve a substantial proportion of the 3-(3,4-dihydroxyphenyl)-L-alanine therein; separating the extract phase from the beans and recovering a 3-(3,4-dihydroxyphenyl-L-alanine product.

2. The process of claim 1 additionally including the step of maintaining the separated extract phase at a temperature in the range of about 20° to 80° C. for a time period in the range of about 1 to 72 hours prior to the recovery step.

3. The process of claim 2 including the additional step of removing insolubles by filtration after the maintenance step and prior to the recovery step.

* * * * *